(12) United States Patent
Grossbier et al.

(10) Patent No.: US 9,549,568 B2
(45) Date of Patent: *Jan. 24, 2017

(54) LOW SODIUM SALT COMPOSITION

(71) Applicant: S & P INGREDIENT DEVELOPMENT, LLC, Minnetonka, MN (US)

(72) Inventors: Dustin Grossbier, Minneapolis, MN (US); Marcello Bermea, Claremont, MN (US); Sambasiva Rao Chigurupati, Omaha, NE (US)

(73) Assignee: S & P INGREDIENT DEVELOPMENT, LLC, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,433

(22) Filed: Feb. 14, 2014

(65) Prior Publication Data

US 2014/0199462 A1 Jul. 17, 2014

Related U.S. Application Data

(63) Continuation of application No. 13/668,838, filed on Nov. 5, 2012, which is a continuation-in-part of application No. 13/106,438, filed on May 12, 2011, now Pat. No. 8,329,236, which is a continuation-in-part of application No. 11/539,129, filed on Oct. 5, 2006, now Pat. No. 7,989,016.

(51) Int. Cl.
*A23L 1/22* (2006.01)
*A23L 1/237* (2006.01)

(52) U.S. Cl.
CPC ............... *A23L 1/237* (2013.01); *A23L 27/40* (2016.08)

(58) Field of Classification Search
USPC ............ 426/659, 74, 661, 658, 97, 506, 520
See application file for complete search history.

(56) References Cited

U.S. PATENT DOCUMENTS

| 1,874,055 | A | 8/1932 | Liebrecht |
| 1,978,040 | A | 10/1934 | Daitz |

(Continued)

FOREIGN PATENT DOCUMENTS

| CA | 1155330 A | 10/1983 |
| CN | 1559436 A | 1/2005 |

(Continued)

OTHER PUBLICATIONS

Mary Ellen Kuhn, Strategies for Reducing Sodium in the U.S., Food Technology, May 2010,34-36, United States.

(Continued)

*Primary Examiner* — Helen F Heggestad
(74) *Attorney, Agent, or Firm* — Fish & Richardson P.C.

(57) ABSTRACT

The present invention relates to a low sodium salt composition and the methods used to make it. The low sodium salt composition includes sodium chloride and a modified chloride salt composition. The modified chloride salt composition includes a homogenous amalgamation of chloride salt, food grade acidulant, and carrier, which does not contain sodium chloride. The modified chloride salt composition may be combined with sodium chloride to form a low sodium salt composition. The modified chloride salt composition may be enhanced to increase particle size.

22 Claims, 17 Drawing Sheets

(56) References Cited

U.S. PATENT DOCUMENTS

| | | | |
|---|---|---|---|
| 2,500,919 A | 3/1950 | Cahn | |
| 2,596,333 A * | 5/1952 | Halpern et al. | 426/96 |
| 2,601,112 A | 6/1952 | Freedman | |
| 2,742,366 A | 4/1956 | Power | |
| 2,824,008 A | 2/1958 | Perri | |
| 2,829,056 A | 4/1958 | Kemmerer | |
| 2,874,027 A | 2/1959 | Gloss | |
| 2,900,268 A | 8/1959 | Rankin | |
| 2,968,566 A | 1/1961 | Munch | |
| 3,505,082 A | 4/1970 | Miller | |
| 3,514,296 A | 5/1970 | Frank | |
| 3,782,974 A | 1/1974 | Lontz | |
| 3,860,732 A | 1/1975 | Eisenstadt | |
| 4,066,799 A | 1/1978 | Cornelius | |
| 4,068,006 A | 1/1978 | Moritz | |
| 4,076,846 A | 2/1978 | Nakatsuka | |
| 4,216,244 A | 8/1980 | Allen, Jr. et al. | |
| 4,243,691 A | 1/1981 | Mohlenkamp | |
| 4,293,535 A | 10/1981 | Arendt | |
| 4,297,375 A | 10/1981 | Shackelford | |
| 4,340,614 A | 7/1982 | Pich et al. | |
| 4,451,494 A | 5/1984 | Roan, III | |
| 4,473,595 A * | 9/1984 | Rood et al. | 426/649 |
| 4,486,456 A | 12/1984 | Thompson | |
| 4,556,566 A | 12/1985 | Bell | |
| 4,556,567 A | 12/1985 | Meyer | |
| 4,556,568 A | 12/1985 | Meyer | |
| 4,556,577 A | 12/1985 | Meyer | |
| 4,556,578 A | 12/1985 | Meyer | |
| 4,560,574 A | 12/1985 | Meyer | |
| 4,734,290 A | 3/1988 | Meyer | |
| 4,748,027 A | 5/1988 | Schou | |
| 4,798,736 A | 1/1989 | Belohlawek | |
| 4,873,108 A | 10/1989 | De Rooij et al. | |
| 4,915,962 A | 4/1990 | Howard | |
| 4,931,305 A | 6/1990 | Karppanen et al. | |
| 4,963,387 A | 10/1990 | Nakagawa et al. | |
| 5,034,378 A | 7/1991 | Cox | |
| 5,064,663 A | 11/1991 | Murray | |
| 5,094,862 A | 3/1992 | Bunick | |
| 5,098,723 A | 3/1992 | DuBois et al. | |
| 5,098,724 A | 3/1992 | DuBois | |
| 5,106,632 A | 4/1992 | Wong et al. | |
| 5,173,323 A | 12/1992 | Omari | |
| 5,213,838 A | 5/1993 | Sheikh | |
| 5,288,510 A | 2/1994 | Gregory | |
| 5,447,543 A | 9/1995 | Sadan | |
| 5,494,689 A | 2/1996 | Lee | |
| 5,562,942 A | 10/1996 | Koh | |
| 5,626,904 A | 5/1997 | Frederiksen | |
| 5,853,792 A | 12/1998 | Zolotov | |
| 5,871,803 A | 2/1999 | Bonorden | |
| 5,897,908 A | 4/1999 | Berglund et al. | |
| 6,013,298 A | 1/2000 | Takano | |
| 6,030,535 A | 2/2000 | Hayashi | |
| 6,048,569 A | 4/2000 | Garcia | |
| 6,090,419 A | 7/2000 | Popplewell | |
| 6,541,050 B1 | 4/2003 | Bonorden | |
| 6,632,467 B1 | 10/2003 | Salvi | |
| 6,743,461 B1 | 6/2004 | Vasquez | |
| 6,753,023 B2 | 6/2004 | Hammond | |
| 6,783,788 B2 | 8/2004 | Kuroda | |
| 6,787,169 B1 | 9/2004 | Maki | |
| 6,926,918 B2 | 8/2005 | LeBlanc | |
| 7,208,189 B2 | 4/2007 | Ghosh et al. | |
| 7,402,328 B2 | 7/2008 | Vasquez | |
| 7,452,563 B2 | 11/2008 | Salemme | |
| 7,455,872 B2 | 11/2008 | Salemme | |
| 7,794,768 B2 | 9/2010 | Dewis | |
| 7,820,225 B2 | 10/2010 | Zuniga | |
| 7,854,956 B2 | 12/2010 | Zuniga | |
| 7,867,520 B2 | 1/2011 | Ikeda | |
| 7,989,016 B2 | 8/2011 | Chigurupati | |
| 8,197,878 B2 | 6/2012 | Chigurupati | |
| 8,231,924 B2 | 7/2012 | Ganesan et al. | |
| 8,231,925 B2 | 7/2012 | Ganesan | |
| 8,329,236 B2 | 12/2012 | Chigurupati | |
| 8,372,463 B2 | 2/2013 | Zuniga | |
| 8,409,653 B2 | 4/2013 | Shimono et al. | |
| 8,435,555 B2 | 5/2013 | Minter et al. | |
| 8,501,253 B2 | 8/2013 | Maeki et al. | |
| 8,932,661 B2 | 1/2015 | Shimono et al. | |
| 8,999,425 B2 | 4/2015 | Meyer | |
| 2003/0008046 A1 | 1/2003 | Gerlat et al. | |
| 2003/0175202 A1 | 9/2003 | Mao | |
| 2005/0142219 A1 | 6/2005 | Dunuwila et al. | |
| 2006/0024422 A1 * | 2/2006 | Bakal | A23L 1/237 426/649 |
| 2006/0115518 A1 | 6/2006 | Tsuchiya | |
| 2007/0059428 A1 | 3/2007 | Chigurupati | |
| 2007/0184176 A1 | 8/2007 | Kuroda et al. | |
| 2007/0292592 A1 | 12/2007 | Zasypkin et al. | |
| 2008/0003339 A1 | 1/2008 | Johnson | |
| 2008/0003344 A1 | 1/2008 | Jensen | |
| 2008/0008790 A1 | 1/2008 | Jensen | |
| 2008/0038411 A1 | 2/2008 | Jensen | |
| 2008/0193591 A1 | 8/2008 | Wada et al. | |
| 2008/0199595 A1 | 8/2008 | Zasypkin et al. | |
| 2009/0041900 A1 | 2/2009 | Zuniga | |
| 2009/0047396 A1 | 2/2009 | Ikeda et al. | |
| 2009/0104330 A1 | 4/2009 | Zasypkin | |
| 2009/0117254 A1 | 5/2009 | Chigurupati | |
| 2009/0155408 A1 | 6/2009 | Dupuy-Cornuaille et al. | |
| 2009/0169701 A1 | 7/2009 | Pfeiffer | |
| 2009/0196957 A1 | 8/2009 | Vadlamani et al. | |
| 2010/0047391 A1 | 2/2010 | Meijer et al. | |
| 2010/0047398 A1 | 2/2010 | Vasquez | |
| 2010/0075017 A1 | 3/2010 | Nishimura et al. | |
| 2010/0227023 A1 | 9/2010 | Wassergord et al. | |
| 2010/0239740 A1 | 9/2010 | Meyer | |
| 2010/0303853 A1 | 12/2010 | Lejeune et al. | |
| 2011/0052785 A1 | 3/2011 | Zueñiga | |
| 2011/0236543 A1 | 9/2011 | Chigurupati | |
| 2011/0244103 A1 | 10/2011 | Chigurupati | |
| 2012/0003358 A1 | 1/2012 | Vadlamani et al. | |
| 2012/0128830 A1 | 5/2012 | Chigurupati | |
| 2012/0164287 A1 | 6/2012 | Lundberg et al. | |
| 2012/0232166 A1 | 9/2012 | Finley et al. | |
| 2013/0196001 A1 | 8/2013 | Moore et al. | |
| 2013/0224361 A1 | 8/2013 | Miyazawa et al. | |
| 2013/0243924 A1 | 9/2013 | Bhandari | |
| 2014/0044846 A1 | 2/2014 | Grossbier | |
| 2014/0234525 A1 | 8/2014 | Berglund et al. | |
| 2014/0314943 A1 | 10/2014 | Adden et al. | |
| 2014/0328991 A1 | 11/2014 | Kobayashi et al. | |
| 2014/0377381 A1 | 12/2014 | Brennan et al. | |
| 2015/0017285 A1 | 1/2015 | Stachiw et al. | |
| 2015/0110926 A1 | 4/2015 | Joly et al. | |
| 2015/0125589 A1 | 5/2015 | Tsuchiya et al. | |

FOREIGN PATENT DOCUMENTS

| | | |
|---|---|---|
| DE | 3418644 A1 | 11/1985 |
| DE | 9302125 | 4/1993 |
| EP | 59363 B1 | 12/1984 |
| EP | 124254 B1 | 3/1987 |
| EP | 183736 B1 | 7/1990 |
| EP | 417062 A1 | 3/1991 |
| EP | 536612 B1 | 7/1995 |
| EP | 441786 B1 | 10/1995 |
| EP | 766927 A1 | 4/1997 |
| EP | 1022252 A2 | 7/2000 |
| EP | 1051086 B1 | 4/2002 |
| EP | 809942 B1 | 7/2003 |
| EP | 919137 B1 | 9/2003 |
| EP | 1933645 A1 | 6/2008 |
| EP | 2119372 A1 | 11/2009 |
| EP | 2007226 B1 | 7/2010 |
| EP | 2247197 B1 | 11/2012 |
| EP | 2086354 B1 | 8/2013 |
| ES | 2302576 A1 | 7/2008 |
| FR | 2196151 B1 | 10/1975 |
| FR | 2973989 A1 | 10/2012 |
| GB | 312088 A | 5/1930 |

(56) References Cited

FOREIGN PATENT DOCUMENTS

| | | |
|---|---|---|
| GB | 713803 A | 8/1954 |
| GB | 1119490 A | 7/1968 |
| GB | 2396793 A | 7/2004 |
| IL | 45392 A1 | 7/1997 |
| JP | 57186460 A | 11/1982 |
| JP | 62166862 A | 10/1987 |
| JP | 2004052449 A | 2/2004 |
| JP | 2008289426 A | 12/2008 |
| KR | 2007082418 A | 8/2007 |
| KR | 2009105762 A | 10/2009 |
| SU | 1375237 A1 | 2/1988 |
| WO | WO8300081 A | 1/1983 |
| WO | WO9216117 A1 | 10/1992 |
| WO | WO9518546 A1 | 7/1995 |
| WO | WO9617521 A1 | 6/1996 |
| WO | WO9723593 A1 | 7/1997 |
| WO | WO9802051 A1 | 1/1998 |
| WO | WO9918811 A1 | 4/1999 |
| WO | WO9940798 A1 | 8/1999 |
| WO | WO03053163 A2 | 7/2003 |
| WO | WO2005086566 A2 | 9/2005 |
| WO | WO2005094615 A1 | 10/2005 |
| WO | WO2007032941 A1 | 3/2007 |
| WO | WO2008096040 A1 | 8/2008 |
| WO | WO2008043054 A3 | 11/2008 |
| WO | WO2009047654 A1 | 4/2009 |
| WO | WO2009116050 A1 | 9/2009 |
| WO | WO2010119282 A1 | 10/2010 |
| WO | WO2012067673 A1 | 5/2012 |
| WO | WO2012093929 A1 | 7/2012 |
| WO | WO2013085858 A2 | 6/2013 |
| WO | WO2014071394 A1 | 5/2014 |
| WO | WO2014127003 A2 | 8/2014 |
| WO | WO2014172483 A1 | 10/2014 |

OTHER PUBLICATIONS

Barbara Katz & Lu Ann Williams, Salt Reduction Gains Momentum, Food Technology, May 2010,25-32, United States.
Christopher M. Parry & Johannes Le Coutre, Monkeying Around With Taste, FoodScienceCentral.com, May 5, 2005, United States.
Nathan Gray, Taste Receptors Understanding May Hold Key for Low-Cal Sweeteners: Review, FoodNavigator.Com, Mar. 3, 2011, United States.
Fidel Toldra & Jose M. Barat, Recent Patents for Sodium Reduction in Foods, Jul. 25, 2008, vol. 1, No. 1, Bentham Science Publishers Ltd., United States.
Thomas Hofmann, Chi-Tang Ho & Wilhelm Pickenhagen, Challenges in Taste Research Present Knowledge and Future Implications.
Jacqueline B. Marcus, R.D., Culinary Applications of Umami, Food Technology, May 2005, p. 24-29, vol. 59, No. 5.
Kikuchi et al. Japanese Patent Application H05-1 03618 1993 Derwent Abstract.
Communication from the European Patent Office dated Jan. 25, 2010, regarding the extended European search report for European Patent Application No. 07853780.0, Applicant RAO, Chigurupati Sambas Iva.
European Search Report for EP 13181746, dated Sep. 18, 2013, 5 pages.
Notification of Transmittal of the International Search Report and the Written Opinion of the International Search Authority, application No. PCT/US07/80510, mailed Aug. 29, 2008, 9 pages.
'Rosemary Extract', Archive.org dated Sep. 28, 2004.
Akerboom, CA 114 7653, Derwent Abstract, 1983.
Understandingfoodadditives.org, Anti-Caking Agents', archive.org, Aug. 25, 2006.
Lawless, H.T., "The taste of calcium chloride in mixtures with NaCl, surcrose and citric acid," Food Quality and Preference [online], vol. 15, 2003, pp. 83-89.
Giffo-Schmitt Beate, International Preliminary Report on Patentability, International Application No. PCT/US2006/034325, issued Mar. 18, 2008, 4 pages.
Thomas Hofmann, Chi-Tang Ho & Wilhelm Pickenhagen, Challenges in Taste Research Present Knowledge and Future Implications, American Chemical Society 2004, Nov. 11, 2003, 24 pages.
Understandingfoodadditives.org, Anti-Caking Agents, archive.org, Aug. 25, 2006, 2 pages.
Notification of Transmittal of the International Search Report and the Written Opinion of the International Search Authority, application No. PCT/US2013/068564, mailed Feb. 25, 2014, 12 pages.
International Search Report and Written Opinion of the International Searching Authority issued in International Application No. PCT/US2014/034405 on Jul. 29, 2014; 7 pages.
Cohen, English Abstract of AR011559, Aug. 30, 2000, 1 page.

* cited by examiner

FIG. 1A  
1st Generation  
(Dry Mix)
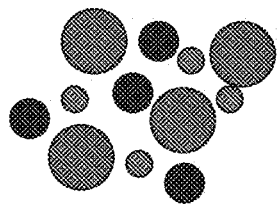
FIG. 1B  
2nd Generation  
(Agglomeration)
FIG. 1C  
Carrier modified KCl  
(Single Crystal)
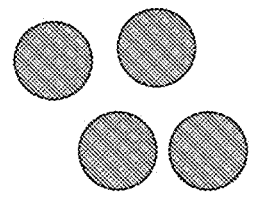
KCl    Modifier    Carrier    Carrier modified KCl

Sensory Testing Data Contd.,
@ Food Perspectives in Mpls.

N = 100 (25 per session)

Applied to 1# of Fresh French Fries (450g); post-fry weight is approx. 300g (33% shrink).

Product types: 1.5g of Test Salt *
1.5g of Diamond Crystal French Fry Salt

| Product type | Inputs of Na and K (mg per 100g) | | Recovery of Na and K ("as eaten") (mg per 100g) | |
|---|---|---|---|---|
| | Na | K | Na | K |
| 1.5g Diamond Crystal | 200 | 0 | 207 | 438 |
| 1.5g Test Salt | 135 | 65 | 120 | 492 |

*Test Salt is S&P Salt Sub, with 27% Na and 13% K. (This is 1/3rd less Na than the Regular Salt or Diamond Crystal Salt).

French Fries Test Results

There were virtually no differences between french fry salt and S&P Salt.

| Attributes | 1.5g French Fry Salt | 1.5g S&P Salt (42% less sodium) |
|---|---|---|
| Overall Appearance | 6.9 | 7.2 |
| Overall Liking | 7.2 | 7.2 |
| Overall Flavor | 7.2 | 7.1 |
| Overall Texture | 7.1 | 7.2 |
| Overall Saltiness | 6.3 | 6.1 |

N = 100
Scores are based on a nine-point hedonic scale, where 1 = dislike extremely, 5 = neither like nor dislike, and 9 = like extremely.
Test conducted at Food Perspectives, Minneapolis, MN

FIG. 11

RESULTS FROM FOOD PERSPECTIVES contd.,

*Intensity Analysis*

- There were no perceivable differences in the intensity of the Aftertaste among the four samples.
- There were no perceivable differences in the greasiness of the mouthfeel among the four samples.

*Table 4: Complete Intensity Results by Sample*

|  | 1.5g Diamond Crystal French Fry Salt | 1.5g S&P #27/13 Test Salt |
|---|---|---|
| Mouthfeel (not at all greasy-very greasy) | 3.2 | 3.3 |
| Saltiness (not at all salty-very salty) | 3.7 | 3.5 |
| Aftertaste (no aftertaste-strong aftertaste) | 2.9 | 2.8 |

*Notes:*
- Scores are based on a seven-point hedonic scale, where 1 = not at all and 7 = very.
- Samples not sharing a letter on a single row (e.g., "a" vs. "b") are significantly different at the 95% confidence level ($p<0.05$).
- Rows without letters indicate no significant difference between samples for that attribute.

FIG. 12

Sliced Deli Ham Test Results

There were virtually no differences between salt and S&P Salt.

| Attributes | Regular Salt | S&P Salt (33% less sodium) |
|---|---|---|
| Texture | 9.22 | 9.40 |
| Ham Flavor | 7.77 | 8.26 |
| Salt Level | 7.35 | 7.61 |
| Salt Intensity | 6.87 | 7.06 |
| Off Flavor | 5.91 | 6.24 |
| Aftertaste | 8.31 | 8.05 |
| Overall Acceptability | 8.20 | 8.28 |

N = 38
Scores are based on a fifteen-point hedonic scale, where 1 = dislike extremely, 7.5 = neither like nor dislike, and 15 = like extremely.
Test conducted at the University of Nebraska.

FIG. 13

SENSORY EVALUATION OF SLICED HAM SAMPLES
Contd.,

Footnotes:

(1) Rated from 0 = very undesirable ; and 15 = very desirable
(2) Rated from 0 = not very firm; and 15 = very firm
(3) Rated from 0 = lacking; and 15 = intense
(4) Rated from 0 = not enough salt; and 15 = too much salt

Comments quoted from Dr.Susan's Report:

"S&P Sample was the Saltiest of all"

"S&P Sample was closest to being 'just about right' for Salt Intensity"

"S&P Sample had the highest level of Ham flavor"

LOW SODIUM SALT COMPOSITION

CROSS-REFERENCE TO RELATED APPLICATIONS

This patent application is a continuation of and claims priority to U.S. application Ser. No. 13/668,838, filed Nov. 5, 2012, now U.S. Pat. No. 8,802,181, which is a continuation-in-part of and claims priority to U.S. application Ser. No. 13/106,438, filed May 12, 2011, now U.S. Pat. No. 8,329,236, which is a continuation-in-part of and claims priority to U.S. application Ser. No. 11/539,129, filed Oct. 5, 2006, now U.S. Pat. No. 7,989,016.

FIELD OF THE INVENTION

The present invention relates to a low sodium salt composition that includes a combination of sodium chloride and modified chloride salt, and the methods of making it. More particularly, the invention relates to a modified chloride salt composition that includes a homogenous amalgamation of chloride salt, food grade acidulant, and carrier. Further, the modified chloride salt composition may be combined with sodium chloride to produce a low sodium salt composition.

BACKGROUND OF THE INVENTION

Salt, or sodium chloride (NaCl), is well known. While salt imparts a desirable flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

Dietary Guidelines issued in the U.S. suggest a proposed consumption limit of 2400 mg of sodium per day and the National Academy of Science (NAS) even suggests a more stringent limit of 1500 mg of sodium per day. The NAS also recommends a potassium consumption limit of 4,700 mg per day. Typically potassium consumption is less than half of that level.

Because of these and other reasons, there are a variety of salt substitutes in the market. The classical approach to production of salt substitutes involves combining the sodium and potassium salts, or occasionally magnesium salts, in various ratios and adding a wide variety of other additives to this mix. The other additives are generally added to mask or at least partially reduce the generally metallic/bitter taste of potassium that has generally been associated with salt substitutes containing potassium. The processing techniques used to make these products include, among others, simple blending, agglomeration, extrusion cooking, and the like.

Examples of salt substitutes are numerous. One type relates to a salt substitute that includes an inner core of potassium chloride coated with a maltodextrin, an inner core of potassium chloride coated with a mixture of maltodextrin and sodium chloride, and an inner core of potassium chloride coated with a mixture of maltodextrin, sodium chloride, and cream of tarter (potassium bitartrate). The process of making these salt substitutes includes coating the potassium chloride with a solution of maltodextrin, maltodextrin and sodium chloride, or a mixture of maltodextrin, sodium chloride, and cream of tarter. As can be seen, a complex mixture of potassium chloride product is formed.

The deficiency with these salt substitutes is that the sodium chloride is reacting with the maltodextrin and the potassium chloride. Although the maltodextrin does mask the bitter/metallic flavor of the potassium chloride, the reaction of the three components changes the sodium chloride's "salty flavor" that is desired by the consumer. Accordingly, a need still exists for salt compositions, which have the same taste and appearance to salt, and are easy and inexpensive to make.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 illustrates the particle arrangement of sodium-replacement compositions known in the art (FIGS. 1A & 1B) in comparison to the composition of the present invention (FIG. 1C).

FIG. 9 depicts the testing parameters and materials used for sensory testing of French fries.

FIG. 10 depicts the sensory test results using a nine-point hedonic scale for French fries.

FIG. 11 depicts the food perspective results using a seven-point hedonic scale for French fries.

FIG. 12 depicts the sensory test results using a fifteen-point hedonic scale for sliced deli ham.

FIG. 13 depicts the sensory evaluation for the sliced deli ham sensory tests.

SUMMARY OF THE INVENTION

Figure 2:
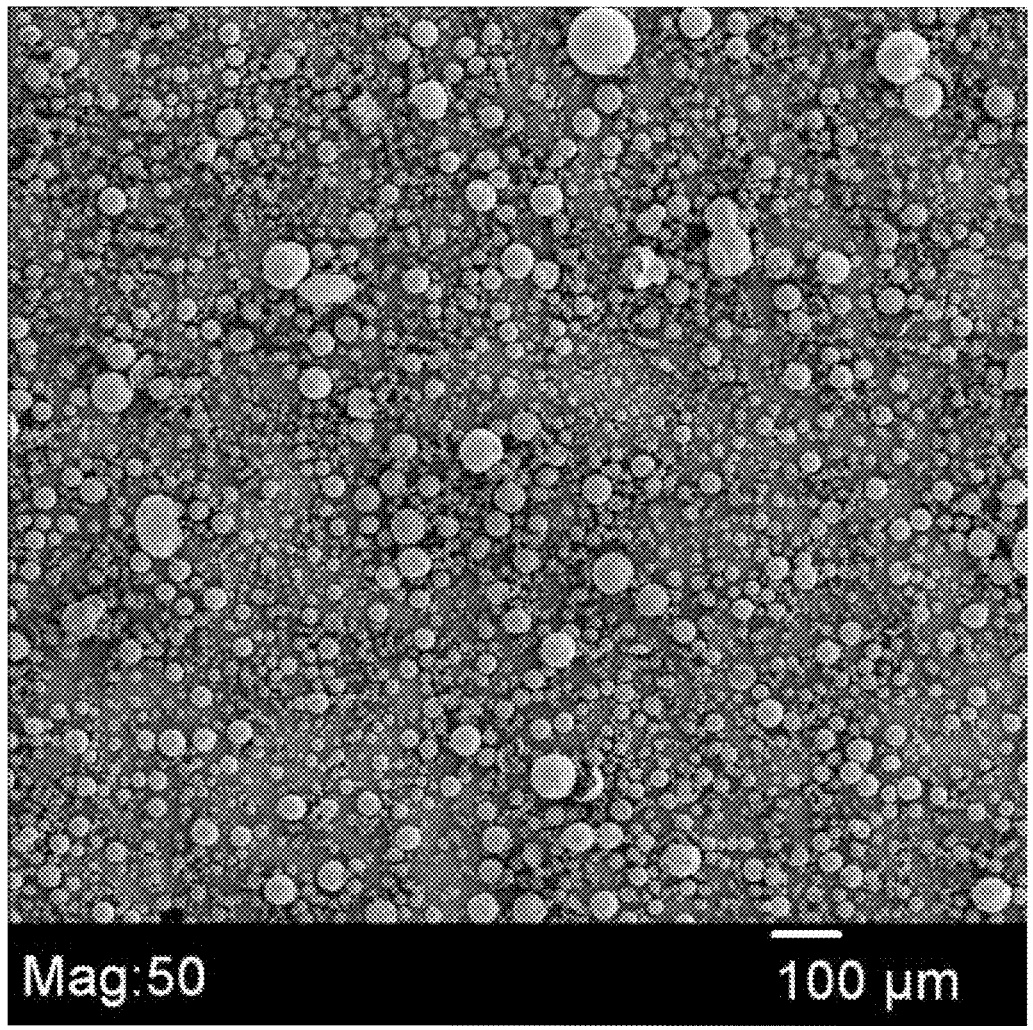
FIG. 2 shows the scanning electron microscopy image at 50× magnification for modified potassium chloride (MKCl).

The present invention is directed to a low sodium salt composition and the components thereof. In particular, the present invention is directed to a low sodium salt composition containing unprocessed sodium chloride and a modified chloride salt product.

The modified chloride salt composition of the present invention is a homogeneous amalgamation of chloride salt, food grade acidulant, and carrier. Each particle comprising the modified chloride salt composition contains a homogeneous mixture of chloride salt, food grade acidulant, and carrier molecules throughout its form. The individual components of chloride salt, food grade acidulant, and carrier are not identifiable within each particle of the composition under magnification.

Suitable chloride salts of the modified chloride salt include potassium, magnesium, calcium, ammonium, and combinations thereof. Preferably, the chloride salt is magnesium chloride, potassium chloride, or a combination thereof. Alternatively, the chloride salt is preferably potassium chloride.

The modified chloride salt may include from about 2.5% to about 80% by weight chloride salt. Preferably, the modified chloride salt includes about 5, 10, 15, 20, 25, 30, 35, 40, 45, 50, 55, 60, 65, 70, or 75% by weight chloride salt. More preferably, the modified chloride salt includes from about 15% to about 30% by weight chloride salt.

Suitable food grade acidulants include citric acid, malic acid, tartaric acid, fumaric acid, lactic acid, acetic acid, benzoic acid and combinations thereof. Preferably, the food grade acidulant is citric acid.

The modified chloride salt may include about 0.1% to about 10% by weight food grade acidulant. Preferably, the modified chloride salt includes about 0.1, 0.25, 0.5, 0.75, 1.0, 1.25, 1.5, 1.75, 2.0, 2.5, 3.0, 3.5, 4.0, 4.5 or 5.0% by weight food grade acidulant. More preferably, the modified chloride salt includes about 0.1% to about 3% by weight food grade acidulant.

Suitable carriers include starch molecules such as cereal starches, cereal flours, dextrin, maltodextrin, monosaccharide, and combinations thereof. Suitable monosaccharides include sucrose, glucose, xylose, ribose and combinations thereof. The preferred carrier may depend upon the drying technique used to produce the modified chloride salt composition. For instance, a carrier that is a cereal flour or cereal starch such as rice flour may produce a better product if drum drying is used. In contrast, a carrier that is a maltodextrin or monosaccharide may produce a better product if spray drying is used.

The modified chloride salt may include about 1% to 75% by weight carrier. Preferably, the modified chloride salt includes about 2, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or 70% by weight carrier. More preferably, the modified chloride salt includes from about 10% to about 25% by weight carrier.

The modified chloride salt composition of claim may also include an additive selected such as an antioxidant, flavorant, anti-microbial agent, phosphate, colorant, anti-caking agent, and combinations thereof.

The present invention also contemplates a low sodium salt composition that includes a modified chloride salt composition and sodium chloride. The modified chloride salt composition is described above. Suitable sodium chloride includes sodium chloride that has not been processed with the modified chloride salt. By way of example, if the modified chloride salt composition was made with a heating step or a step where the pH was lowered, a suitable sodium chloride for the present invention is sodium chloride that has not been heated or treated to adjust pH levels.

The low sodium salt composition of the invention may also contain additives. Suitable additives may include antioxidant, flavorant, anti-microbial agent, phosphate, colorant, anti-caking agent, and combinations thereof.

The low sodium salt composition of the invention has lower sodium content than that of regular table salt. Preferably, the composition contains about 10-90%, lower sodium than regular salt. More preferably, the composition contains about 25%, 30%, 35%, 45%, 50%, 55% or 75% lower sodium than regular salt. More preferably, the composition contains about 50% less sodium than regular salt.

The low sodium salt composition of the invention may be in liquid or solid form. The state of the composition depends upon the intended use. Suitable uses of the compositions of the invention include as a common salt substitute for the production of products in the food industry or as spice mixtures. Exemplary products the compositions may be used in include soups, sauces, baked goods, meat products, dairy products, and breakfast cereals. Furthermore, the compositions may be used as table salt. Also, the compositions of the invention may be used in food products.

DESCRIPTION OF THE PREFERRED EMBODIMENTS

In accordance with the present invention, a process for making a salt composition having the same appearance and taste as salt, while having a reduced sodium content, has been discovered. As used herein, salt, unless modified by another word (i.e. reduced-salt, potassium salt, calcium salt and the like) or used itself to modify another word (i.e. salt substitute, salt composition and the like), means sodium chloride (NaCl).

Related to that process, the resultant low sodium salt composition that includes sodium chloride and a powdered or granular carrier modified chloride salt has been discovered. As used herein, a chloride salt may be any single compound such as a chloride of potassium, magnesium, calcium, lithium, ammonium, or a mixture thereof, other than a chloride of sodium. The carrier modified chloride salt includes a mixture of a chloride salt, a modifier, and a carrier. The modifier helps to at least partially dissolve the chloride salt making it easier for it to bind to the carrier. The carrier binds the modified chloride salt and in combination with the modifier reduces the bitterness and off-flavors associated with the chloride salt. In addition, the carrier modified salt has the appearance and taste of salt, i.e. sodium chloride.

The process of making the salt composition of the present invention includes contacting a chloride salt and a modifier to form a modified chloride salt product, mixing the product with a carrier to form a carrier modified chloride salt solution, and then drying the solution to form a powdered or granular carrier modified chloride salt. The process also includes blending the powdered or granular carrier modified chloride salt with sodium chloride to form a dry mixture and grinding the dry mixture to form the salt composition.

The process of making the salt composition ensures that the sodium chloride (NaCl) remain in its natural, unaltered state. By ensuring that the NaCl remain in its natural state, it is believed that the saltiness and flavor associated with NaCl will not be altered. As such, the salt composition of the present invention, that includes both NaCl and the carrier modified chloride salt, has less sodium, but still has the same saltiness, taste, and appearance of a composition that includes only NaCl.

The first step of the process includes forming a powdered or granular carrier modified chloride salt. First, the process includes contacting or mixing a chloride salt and a modifier in an aqueous solution to form a modified chloride salt product. As discussed above the chloride salt may be any compound such as a chloride of potassium, magnesium, calcium, lithium, ammonium, or a mixture thereof, other than sodium. Preferably, the chloride salt is potassium chloride. The modifier may be any compound that increases the relative solubility of the chloride salt, at least partially dissolving it, and lowers the pH of the mixture of chloride salt, modifier, and water. Preferably, the pH is lowered below a pH of about 10, 9, 8, 7, 6, 5, 4, 3, 2, or 1. More preferably, the pH is lowered below a pH of about 7. More preferably, the pH is between a pH of about 3 to 4. The modifier must also be edible and be of a nature such that the taste of sodium chloride will not be significantly altered by it. The modifier, by itself or in combination with the carrier, masks the bitter or metallic off flavor associated with the chloride salt. Preferably, the modifier is a food grade acidulant. Suitable food grade acidulants include any food grade acids, such as citric acid, tartaric acid, acetic acid, malic acid, fumaric acid, lactic acid, benzoic acid and/or their derivatives, as well as natural sources of such acids, such as lemon juice or the like. Preferably, the food grade acidulant is citric acid.

The process includes mixing from about 60% to about 80% by weight water, from about 15% to about 30% by weight chloride salt, and from about 0.1% to about 3% by weight modifier. Preferably, the process includes mixing about 70% by weight water, 29% by weight potassium chloride, and about 1% by weight citric acid.

Typically, the chloride salt, modifier, and aqueous solution is mixed for a time sufficient to thoroughly dissolve the chloride salt. Generally, the chloride salt and modifier are added to a mixing vessel containing water at a temperature of from about 150° F. to about 220° F., preferably about 195° F. The mixing vessel may be any suitable vessel having a means of agitation. Thus, when mixed, a modified chloride salt product is formed.

The modified chloride salt product is then mixed with a carrier, that in combination with the modifier, masks the bitter or metallic off flavor associated with the chloride salt and forms a carrier modified chloride salt solution. In addition, the carrier is selected such that the carrier modified chloride salt has the appearance of salt, i.e. sodium chloride. As such, the carrier may be any short chained starch molecule that reacts with the modified chloride salt to reduce the bitter flavor of the chloride salt and produces a white colored finished product. Suitable carriers include monosaccharides, such as sucrose, glucose, xylose, and ribose, and dextrins, such as maltodextrin and dextrose, among others. Suitable carriers also include cereal starches such as rice starch, rice cereal, and rice flour. Preferably, the carrier is maltodextrin. Suitable maltodextrins have a degree of polymerization of from less than about 10 to less than about 30. The degree of polymerization is the length in monomeric or base units of the average linear polymer chain at time t in a polymerization reaction. The following formula is used to calculate the degree of polymerization:

$$DP = \frac{M_t}{M_0}$$

where
$M_t$=molecular weight at time t
$M_0$=molecular weight of one monomeric unit Any suitable maltodextrin may be used in accordance with the present invention. Preferably, the maltodextrin is water soluble and has a degree of polymerization of less than 10. For example, suitable maltodextrins, such as Maltrin M040, Maltrin M100, or Maltrin M150 may be purchased commercially from Grain Processing Corporation.

The process includes mixing from about 75% to about 90% by weight of the modified chloride salt product with from about 10% to about 25% by weight of the carrier to form a carrier modified chloride salt solution. Preferably, the process includes mixing about 87.5% by weight of the modified chloride salt product with about 12.5% by weight of the maltodextrin to form a carrier modified chloride salt solution. Generally the weight percentages will vary based on the carbon length of the carrier and the amount of chloride salt product used to make the solution. Typically, the modified chloride salt product is mixed with the carrier in a suitable vessel that includes an agitation means to avoid the formation of lumps in the solution. The solution is then heated to at least about 185° F. to ensure that the mixture is smooth, fairly thick and pourable. Alternatively, the solution may then be mixed with an additional amount of water to ensure that the solution is less viscous for ease of the drying process. For example, the carrier modified chloride salt solution may be mixed with from about 0% to about 40% by additional weight water prior to drying the solution.

The modified chloride salt solution is then dried to form a powdered or granular carrier modified chloride salt. Generally, any process known in the art that produces a powdered or granular carrier modified chloride salt may be used. Suitable drying processes include, without limitation, drum drying and spray drying techniques. A preferred process is spray drying. A spray drier operates by atomizing a stream of the modified chloride salt solution using hot air in a drying chamber. The atomization breaks the solution into small droplets, thereby increasing the surface area and thus the rate of evaporation. The small size of the droplets result in a relatively large surface area that dries quickly. The particles are removed from the drier typically within 30 seconds. The temperatures of the particles during the drying process can range from wet-bulb temperature of the inlet air to above 212° F. (100° C.) as they exit in the dry state. The operating conditions may be selected according to the drying characteristics of the product and the desired granule or powder size. Typically, any spray drier design may be used in accordance with the present invention. For example the drier may be designed to have co-current, counter-current, or mixed air flow. In a co-current system the drying air and particles move through the drying chamber in the same direction. In a counter-current system the drying air and the particles move through the drying chamber in opposite directions. Finally, in a mixed air flow system the particles experience both co-current and counter-current phases.

Alternatively, the modified chloride salt solution may be used in a liquid form. In this alternative, the modified chloride salt solution is blended or mixed with a dry mixture of sodium chloride to form a salt composition solution.

The second step of the process includes blending or mixing the powdered or granular carrier modified chloride salt with sodium chloride and grinding the dry mixture to form a salt composition. The present invention ensures that the sodium chloride remains in its natural, crystalline form, rather than reacting with the modified chloride salt. In addition, the process is cost effective, as only the carrier modified chloride salt solution needs to be dried. The NaCl does not need to be dried, it is only blended and ground, in its natural form, with the powdered or granular carrier modified chloride salt.

The powdered or granular carrier modified chloride salt is mixed with sodium chloride in an approximate ratio of ⅓ carrier modified chloride salt to ⅔ sodium chloride by weight in the second step. The mixing or blending of the powdered or granular carrier modified chloride salt and sodium chloride may be conducted in any suitable vessel. After the powdered or granular carrier modified chloride salt and the sodium chloride are mixed, the dry mixture may be ground or milled to the salt composition's desired particle size. Similarly to the mixing vessel, any suitable grinder or mill may be used in accordance with this invention. Alternatively, if larger particle sizes are desired the salt composition may be agglomerated or crystallized at lower temperatures.

The salt composition may have any desired particle size. The salt composition typically has a particle size larger than about 100 mesh, U.S. standard sieve size. Preferably, the salt composition has a particle size of between about 35 and about 60 mesh. It should be recognized that the particle size of the composition is selected to meet the particular end use application. "Pretzel grade" salt generally has a particle size that passes through a 35 mesh sieve, whereas "shaker grade" salt has a particle size that passes through between a 35 and a 60 mesh sieve. "Popcorn grade" salt has a particle size that passes through a 60 mesh sieve. Once ground, the salt composition should have less than about 10% of all granules, which are finer than 100 mesh. All mesh sizes are by U.S. standard sieve size.

Additionally, silicon dioxide may be included in the salt composition to prevent caking. In one aspect of the present invention from about 0.1% to about 2% by weight of silicon dioxide may be added to the composition, preferably about 1% by weight of silicon dioxide.

The resultant salt composition includes from about 10% to about 90% by weight sodium chloride, from about 2.5% to about 80% by weight chloride salt, from about 1% to about 75% by weight carrier, and from about 0.1% to about 5% by weight modifier. Preferably, the resultant salt composition includes about 50% by weight sodium chloride, about 40% by weight potassium chloride, about 8% by weight maltodextrin, and about 1% by weight citric acid.

The salt composition of the present invention includes from about 10% to about 30% by weight sodium and from about 5% to about 15% by weight potassium.

Alternatively, other additives may be included in the carrier modified chloride salt product. Suitable additives include, for example, antioxidants, to reduce the rancidity of the salted products when cooked, phosphates, to tenderize the salted food product, and/or colorants, to give the salt composition a distinct color. Suitable antioxidants include rosemary extract, butylatedhydroxytoluene, butylatedhydroxyanisole, and tocopherols, among others. Suitable phosphates include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, and potassium tripolyphosphate. Suitable natural colorants include caramel color, turmeric, annatto, beta-carotene, paprika oleoresin, red cabbage juice, beet juice, grape skin extract, and carmine, among others. Alternatively, the antioxidant used may also act as a colorant. Preferably, the modified chloride salt product includes rosemary extract as an antioxidant. Rosemary extract may be included at a dosage of from about 100 ppm to about 1000 ppm by weight of the modified chloride salt product.

The salt composition of the present invention may be used as a substitute for salt, i.e. sodium chloride. Similarly, the salt composition of the present invention may be used in addition to or as a blend to salt. The salt composition of the present invention may be used in a variety of applications as table salt, inclusion in snack foods, baked goods, to season meats and poultries, and for other food items that have included salt. Preferably the salt composition of the present invention is used to injection marinate meats and poultries as the composition has a low viscosity and can be processed through a meat injection needle.

Modified Chloride Particle Enhancement Process

The modified chloride composition of the invention can be enhanced to produce particles having a larger mesh size, a variety of flavors, a variety of textures, increased nutritional value with vitamins and minerals, increased shelf-life, or a combination thereof.

In some embodiments, the modified chloride composition of the invention is enhanced to produce particles having a larger mesh size. The mesh size may be 20 mesh or greater depending on the particle size desired. The mesh size average can be varied between 20-200 or more mesh. For instance, the enhancement process may be repeated to achieve particle sizes on average of about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, and more. One skilled in the art will recognize that the mesh size depends upon the desired particle size and varies depending upon the ultimate use.

The enhancement process includes applying additional material to the modified chloride composition. In particular, modified chloride particles are contacted with an aqueous solution followed by a drying step. In some embodiments, the aqueous solution includes sodium chloride and water. A suitable aqueous solution includes about 5-30% of sodium chloride. The aqueous solution may include about 5, 10, 15, 20, 25, 30% or more sodium chloride. Preferably, the aqueous solution includes about 10-30% sodium chloride. In another embodiment, the aqueous solution may include additives. Suitable additives include those well known in the art to enhance or alter flavor, nutritional value, and color. Exemplary additives include, without limitation, flavorants, vitamins, minerals, mineral salts, bitter blocking compounds, those known in the art or yet to be discovered, and combinations thereof. In another embodiment, the enhancement process may be used for iodization of the product. One skilled in the art will recognize that the amount range for additional ingredients is only limited by solubility in the spray solvent and desired run time.

The aqueous solution may include a food grade solvent. Any food grade solvent known in the art or yet to be discovered is contemplated herein. In one embodiment, the solvent is water. In another embodiment, the solvent is a food grade solvent that is not water. In another embodiment, the solvent is a combination of a food grade solvent that is not water and water.

The drying step may be accomplished by any method known in the art. Suitable drying methods include, without limitation, spraying, continuous fluid bed dryers, dry roller compaction, wet granulation, comminuting mill, and combinations thereof. Preferably, a batch style dryer is used. More preferably, a fluid bed dryer is used.

One cycle of the enlargement process includes contacting modified chloride particles with an aqueous solution and subsequently drying the particles. Additional cycles of the process may be used to produce larger particles. In some embodiments, the individual particles may agglomerate to form larger particles. In some embodiments, the larger particles may subsequently be ground to produce smaller particles. In some embodiments, the enlarged particles may be blended with sodium chloride or another chloride salt to produce a low sodium salt composition.

In some embodiments, the modified chloride composition may be enhanced to have a specific flavor profile. Flavorants may be added to the modified potassium chloride during production. Flavorants may be added to the aqueous solution used to enhance the modified chloride composition. Suitable flavorants include any known in the art and combinations thereof. Exemplary flavorants include, without limitation, amino acids, nucleotides, seasoning powders, yeast extract, garlic powder, onion powder, and others well known in the art.

In some embodiments, the modified chloride composition may be enhanced to have a specific texture profile. The texture of the modified chloride composition may be modified by using different methods of drying or applying the aqueous solution used to enhance the modified chloride composition. Further, the texture may be modified by using additives such as hydrocolloids, gum, additives known in the art to affect texture, or combinations thereof in the aqueous solution used to enhance the modified chloride composition.

In some embodiments, the modified chloride composition may be enhanced to have a specific nutritional profile. Additives that enhance the nutritional value of the modified chloride composition may be added to the aqueous solution used to enhance the modified chloride composition. Suitable additives include those known in the art and combinations thereof. By way of example, vitamins, minerals, or a mixture thereof, may be added to the aqueous solution to produce a nutritionally enhanced modified chloride composition.

In some embodiments, the modified chloride composition may be enhanced to have an increased shelf-life. The shelf-life of the modified chloride composition may be enhanced by including anti-microbial agents in the aqueous solution used to enhance the modified chloride composition. Suitable anti-microbial agents include those known in the art as well as combinations thereof. Such anti-microbial agents will reduce activity of microorganisms capable of degrading the modified chloride composition.

DEFINITIONS

Unless defined otherwise, all technical and scientific terms used herein have the same meaning as is commonly understood by one of ordinary skill in the art. All patents, applications, published applications and other publications are incorporated by reference in their entirety. In the event that there is a plurality of definitions for a term herein, those in this section prevail unless stated otherwise.

As used herein, "agglomeration" or "dry mixture" refers to a combination or mixture of components such that the constituent components in the combination or mixture are indistinguishable from one another upon non-magnified visual inspection.

As used herein, "amalgamation" refers to a combination or mixture of components such that the constituent components in the combination or mixture are indistinguishable from one another upon magnified visual inspection.

As used herein, "homogenous" refers to a substance that is uniform throughout in composition. For instance, a homogenous mixture has the same properties throughout the sample. Examples of homogenous mixtures include brass, which is a solid solution of copper and zinc, or aqueous solutions such as thoroughly stirred mixtures of sugar in water. The term does not include heterogeneous mixtures that consist of two or more regions, or phases, that differ in properties. Heterogeneous mixtures include mixtures having different layers with each layer differing in properties. Examples of heterogeneous mixtures include a mixture of gasoline and water, where the gasoline floats on the water as a separate layer.

The following examples are simply intended to further illustrate and explain the present invention. The invention, therefore, should not be limited to any of the details in these examples.

EXAMPLES

Example 1

Spray Drying to Make Modified Chloride Salt 30.7 lbs of water were heated in a steam kettle with a swept surface agitator to a temperature of 195° F. 12.5 lbs of potassium chloride (KCl) were then added into the hot water and mixed for 5 minutes. After that, 0.5 lbs of citric acid were added to the hot water and mixed for an additional 5 minutes until the KCl was completely dissolved.

After mixing in the citric acid, 0.025 lbs of rosemary extract were added to the mixture. Finally, 6.25 lbs of maltodextrin (Maltrin 040 purchased commercially from Grain Processing Corporation) were added to the mixture with constant agitation to avoid lumping. The final mixture of the carrier modified potassium chloride solution was heated to a minimum temperature of 185° F. The carrier modified potassium chloride solution was smooth, fairly thick, and easily pourable.

The carrier modified potassium chloride solution was then spray dried to form a powdered carrier modified potassium chloride. The liquid mixture's temperature was 175° F. The air inlet temperature was 286° F. and the air outlet temperature was 184° F. The vacuum on the drying chamber was 0.10 in/water.

The dried carrier modified potassium chloride was white in color, free flowing, and a very fine powder.

Example 2

Making Salt Composition

The powdered carrier modified potassium chloride from Example 1 was mixed in a ratio of ⅓ powdered carrier modified potassium chloride to ⅔ by weight natural, unmodified sodium chloride and 1% by weight silicon dioxide. The salt composition was then mixed and ground in an Udy Cyclone Mill through a 1 mm screen (UDY Corporation, 201 Rome Court, Fort Collins, Colo. 80524).

Example 3

Drum Drying to Make Modified Chloride Salt

Carrier modified potassium chloride was made by adding 2271 liters of water to a mix tank and heating the water to 195° F. The heated water was transferred to a Breddo Mixer and 1134 kilograms of potassium chloride was added. Once the potassium chloride was dissolved, about 27 kilograms of citric acid was added and the temperature was maintained at 155° F. The mixture was blended for about 5 minutes and had a pH of about 3.0 to 4.0. While maintaining the pH between 3 and 4, about 226.8 kilograms of rice flour was slowly added and mixed until no lumps were visible. The mixture was then transferred to a mix tank and heated to a final temperature of 175° F. The carrier modified potassium chloride mixture was then drum dried to form a powdered carrier modified potassium chloride.

Example 4

Characterization of Carrier Modified Chloride

The carrier modified potassium chloride compositions made in Examples 1 and 2 were analyzed to determine their inherent properties. The Example 1 composition is a carrier modified potassium chloride ("MKCl"), which is a single crystal formed from a homogenous solution of modified potassium chloride and carrier. As depicted in FIG. 1, the MKCl of Example 1 (FIG. 1C) forms a single crystal homogenously containing the modified potassium chloride and carrier as a single amalgamation of components, rather than the dry or agglomerated, heterogeneous mixture of independent particles of carrier, modifier and potassium chloride found in low sodium salt substitutes known in the art (FIGS. 1A & 1B). The Example 2 composition is the composition of Example 1 combined with sodium chloride (S&P Salt). The carrier modified potassium chloride compositions in addition to sodium chloride and unmodified potassium chloride were analyzed using scanning electron microscopy and sensory tests.

Figure 3:
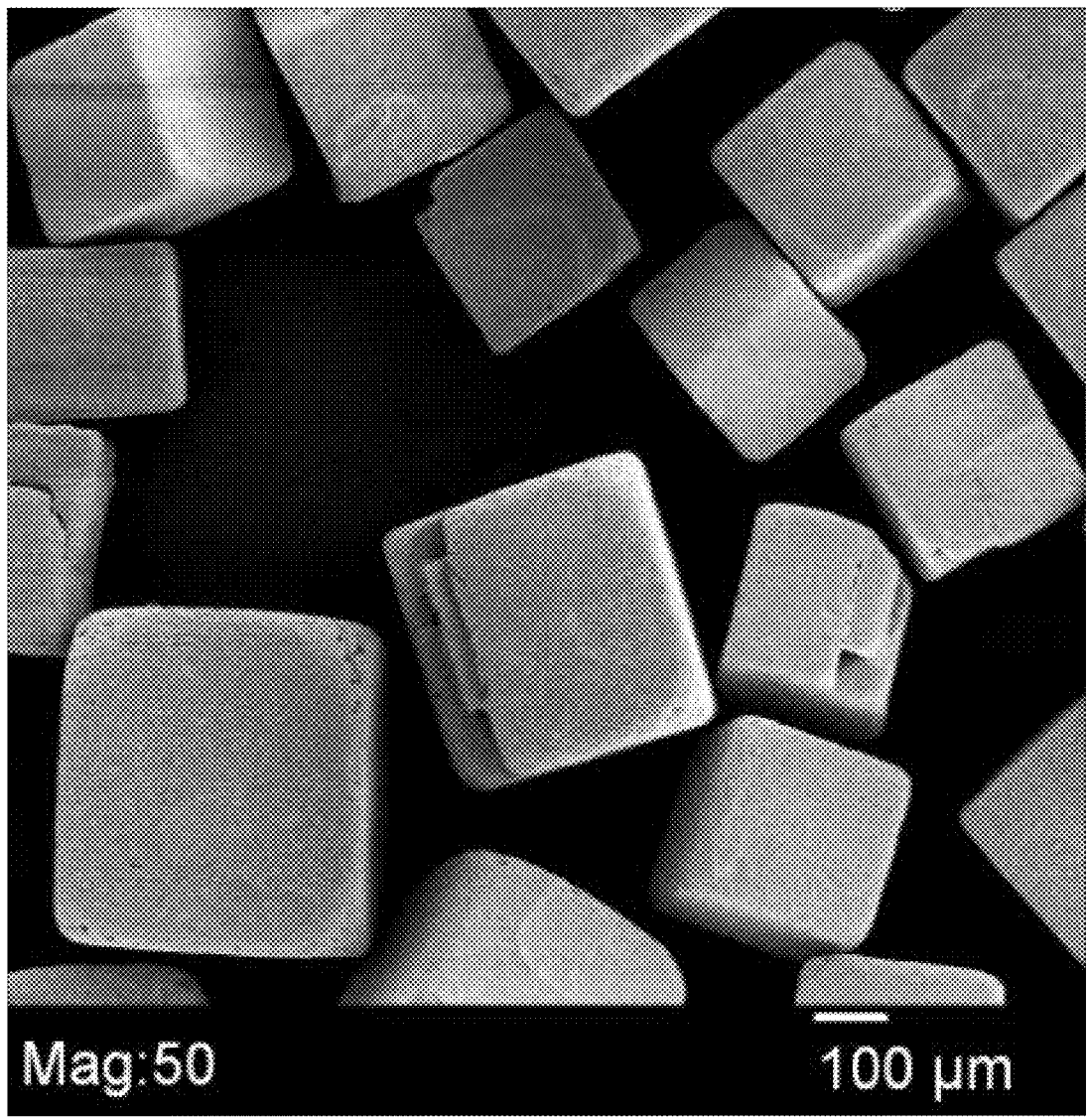
FIG. 3 shows the scanning electron microscopy image at 50× magnification for sodium chloride (NaCl).
Figure 4:
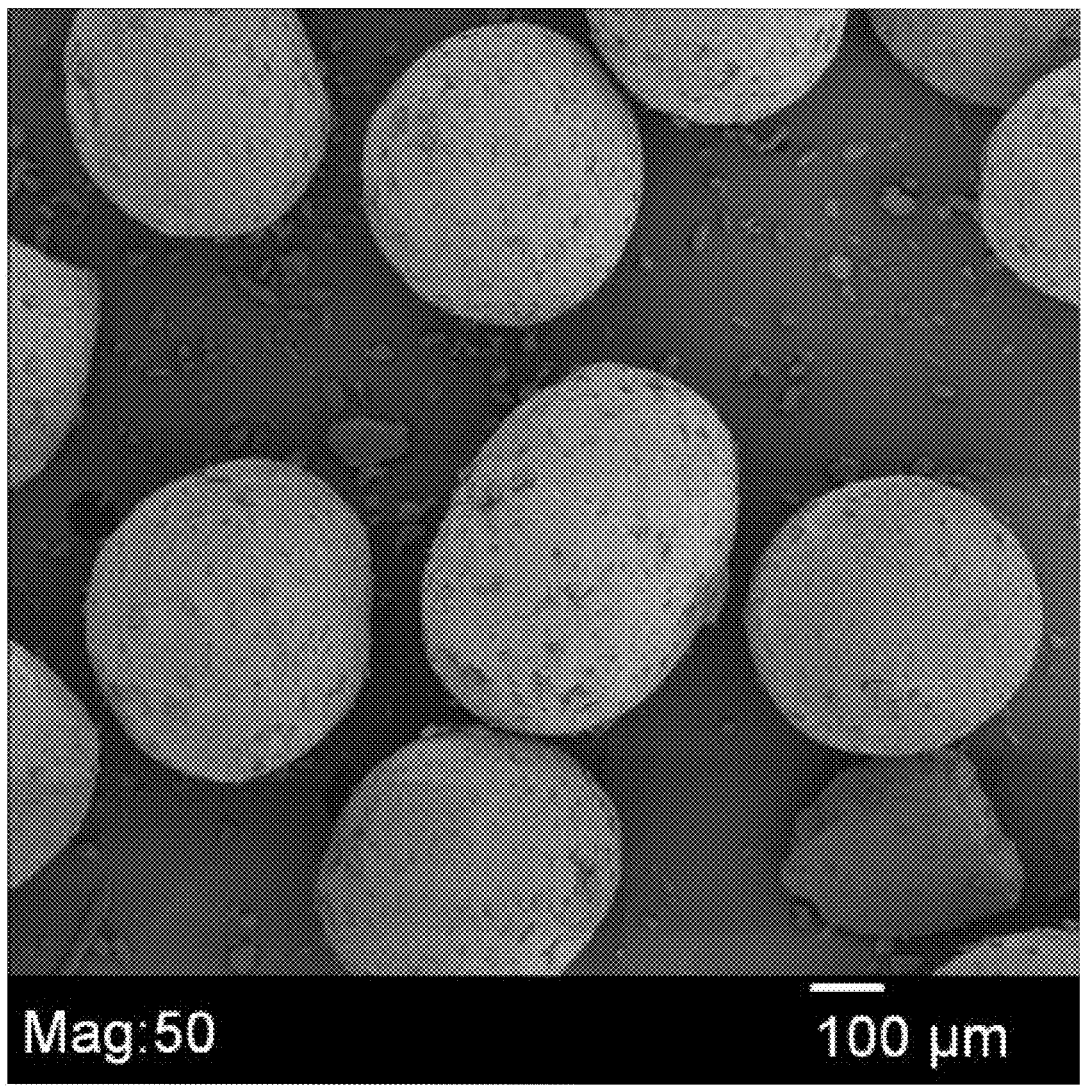
FIG. 4 shows the scanning electron microscopy image at 50× magnification for unmodified potassium chloride (KCl).
Figure 5:
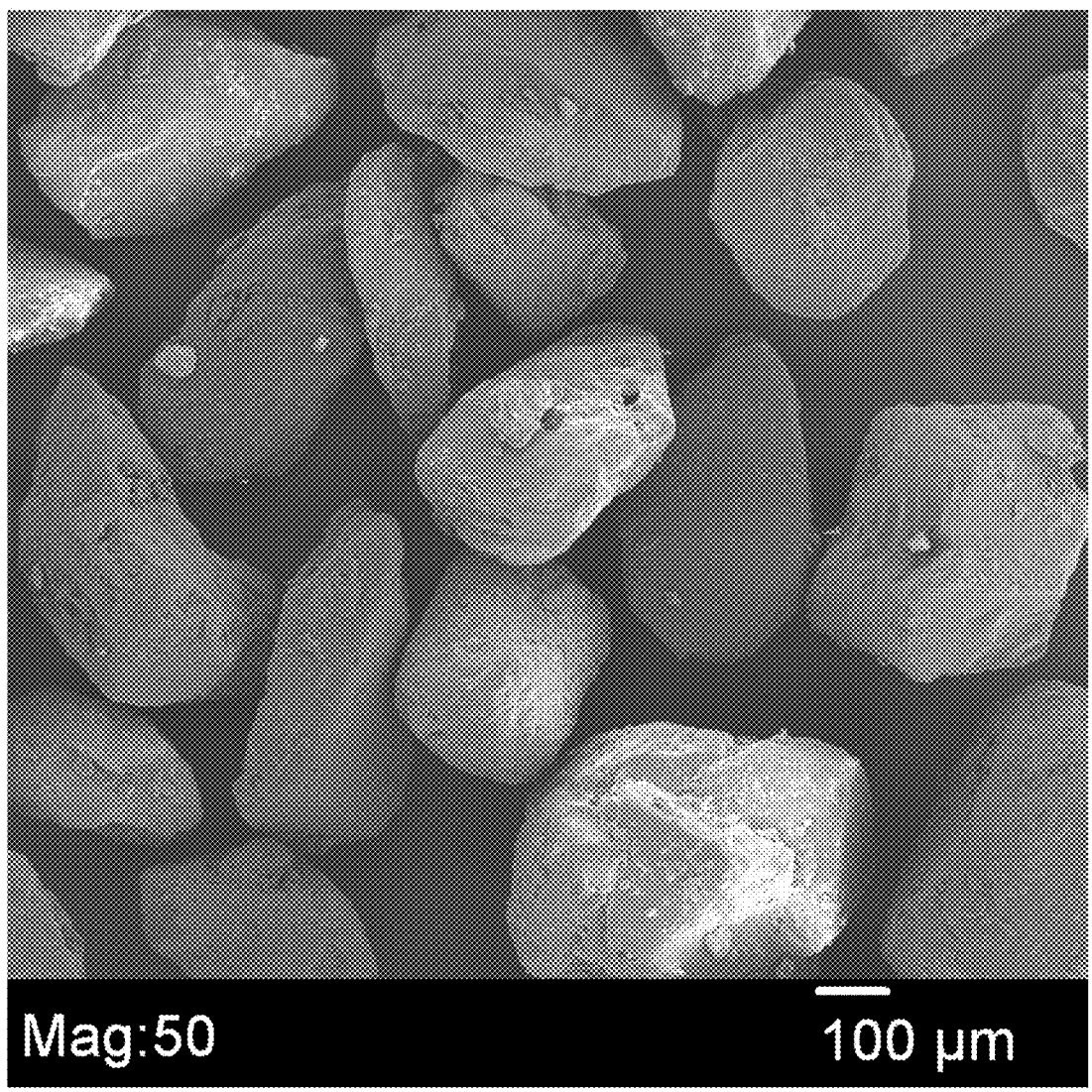
FIG. 5 shows the scanning electron microscopy image at 50× magnification for citric acid.
Figure 6:
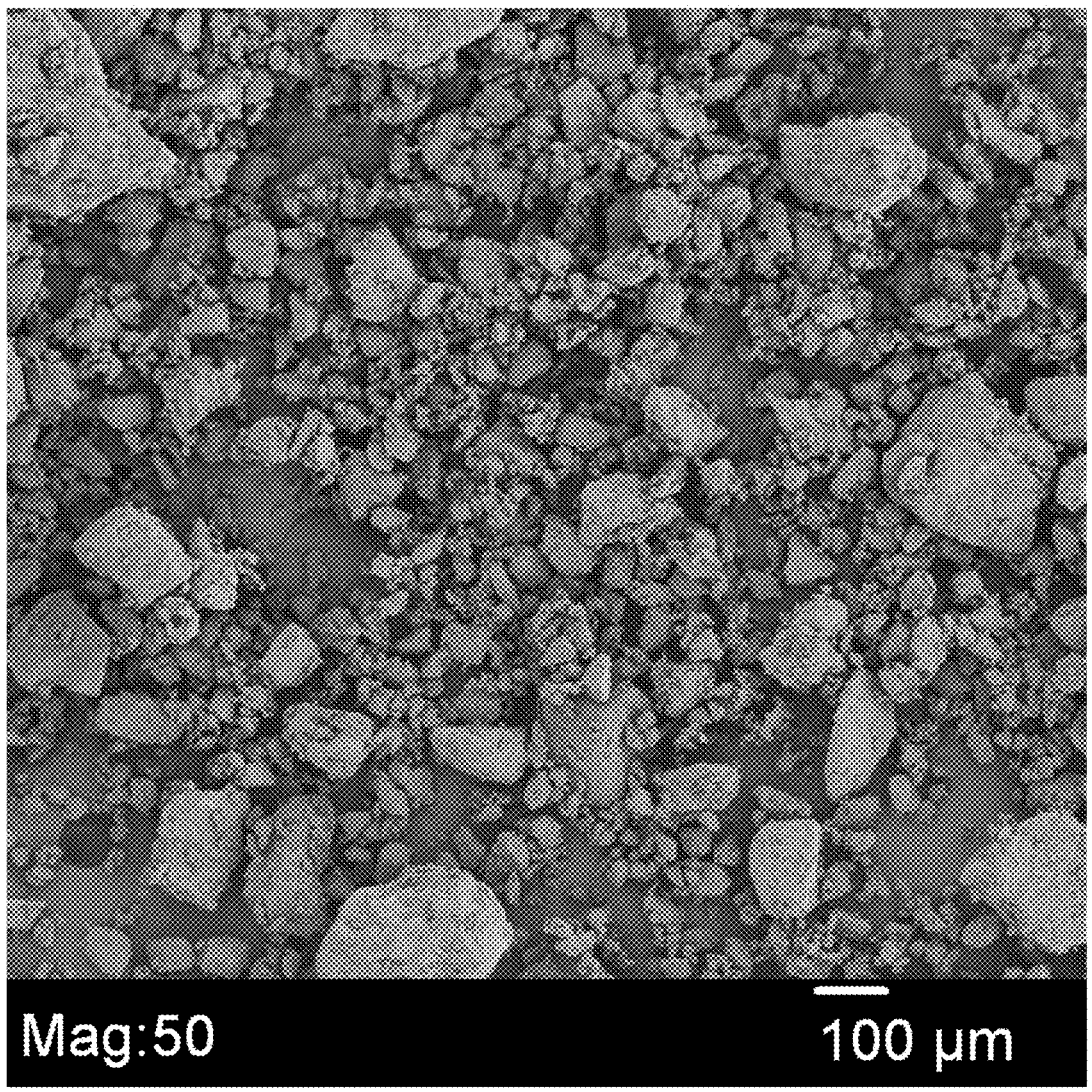
FIG. 6 shows the scanning electron microscopy image at 50× magnification for rice flour.

Scanning electron microscopy techniques were used to analyze the micro-structure of the MKCl of Example 1 (FIG. 2) in comparison with sodium chloride (FIG. 3), unmodified potassium chloride (FIG. 4), citric acid (FIG. 5) and rice flour (FIG. 6). Comparison of unmodified potassium chloride (FIG. 4) and MKCl (FIG. 2) at the same magnification showed that MKCl of Example 1 has a smaller particle size than unmodified potassium chloride. Further, the particle shape characteristics of MKCl are clearly distinct from those of sodium chloride (FIG. 3), citric acid (FIG. 5) and rice flour (FIG. 6).

Figure 7A:
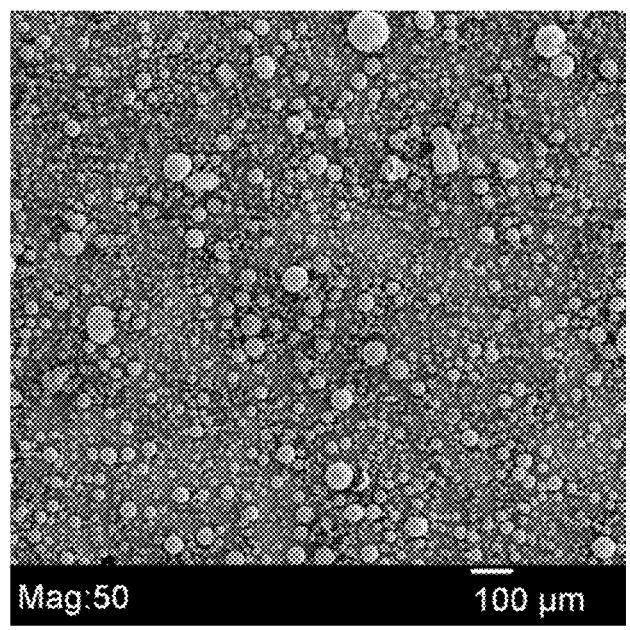
FIG. 7 shows the scanning electron microscopy image at 50× (FIG. 7A) and 500× (FIG. 7B) for spray-dried MKCl.
Figure 7B:
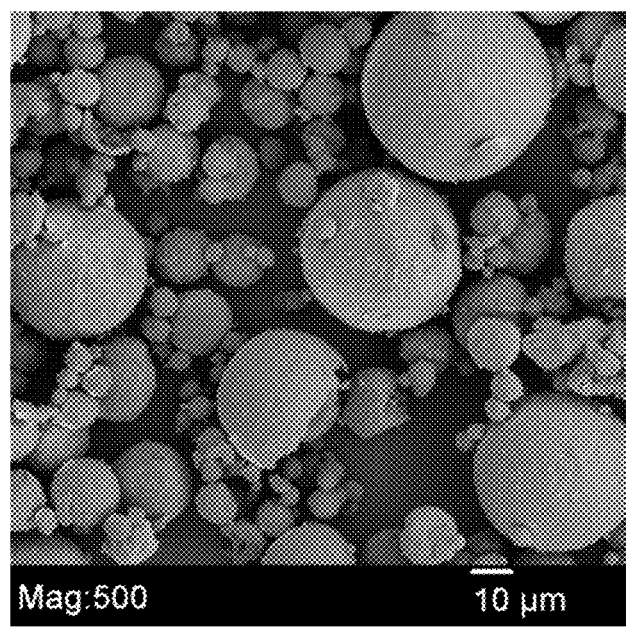
Figure 8A:
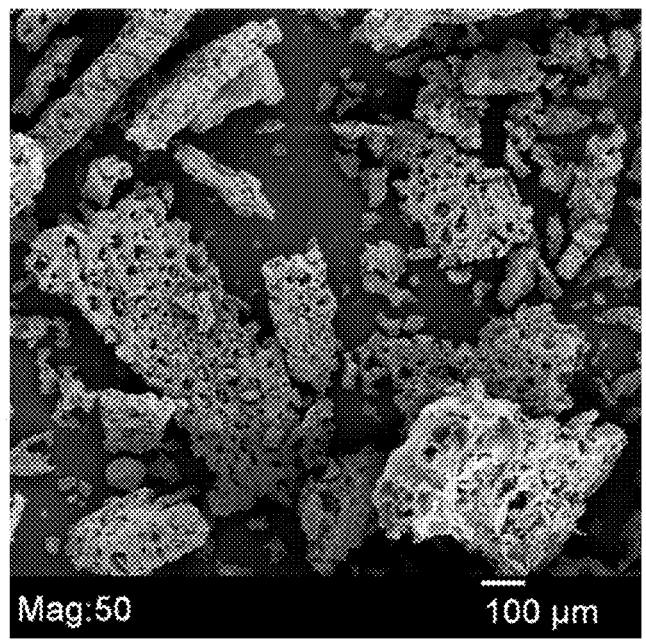
FIG. 8 shows the scanning electron microscopy image at 50× (FIG. 8A) and 500× (FIG. 8B) for drum-dried MKCl.
Figure 8B:
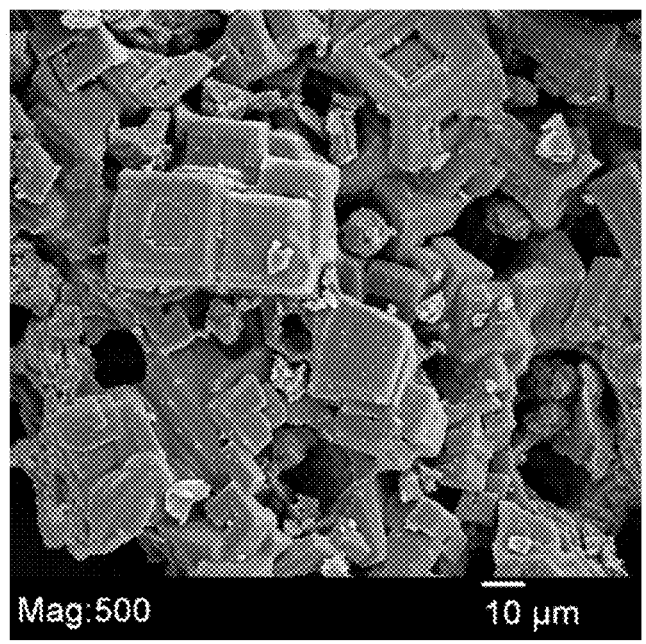

Further, scanning electron microscopy techniques were used to analyze micro-structure differences between spray-dried (SD) (FIG. 7) and drum dried (DD) MKCl (FIG. 8). Comparison of spray-dried MKCl and drum dried MKCl at the same magnification showed that MKCl has different particle characteristics depending upon the drying method used. The shape characteristics of spray-dried MKCl are clearly distinct from those of drum dried MKCl. Further, the particle shape characteristics of both spray-dried and drum dried MKCl are distinct from that of unmodified potassium chloride (FIG. 4) and of sodium chloride, citric acid, rice flour and potassium chloride.

Sensory tests were conducted to analyze the taste characteristics of the carrier modified potassium chloride composition of Example 2 in comparison with salt substitutes known in the art.

Sensory tests were conducted using French fries coated with either the salt substitute of Example 2 or a commercially available table salt substitute (Diamond Crystal Salt). The testing materials are shown in FIG. 9 and the results from the food perspectives are shown in FIG. 10. There were no differences on any Hedonic measures, such as overall liking, appearance liking, flavor liking, texture liking and saltiness liking due to either salt level or salt type (FIG. 11). There were no perceivable differences in the intensity of the aftertaste or the greasiness of the mouthfeel among the samples.

Sensory tests were also conducted using ham samples prepared with either the salt substitute of Example 2 or regular salt. The results of the sensory evaluation by 38 subjects and testing design are depicted in FIGS. 12 and 13. The salt substitute of Example 2 was found to have salt flavor that was indistinguishable from regular table salt.

Example 5

Enhancing Modified Potassium Chloride Based Low Sodium Salt Compositions

The modified potassium chloride composition prepared in Example 1 or Example 3 was placed in a batch fluid bed system (Glatt GPCG-1). A solution of sodium chloride and water was applied to the dry modified potassium chloride composition to initiate particle enhancement (See Table 1 for amounts). The wetted particles were allowed to dry, completing one cycle of particle enhancement. The process of wetting the modified potassium chloride particles with a solution of sodium chloride and water followed by drying was repeated until three full cycles were completed. For this application, product temperatures were kept between 40° C. and 60° C. The solution addition rate during the wetting phase was set at 40 mL per minute. The inlet temperature was set at 95° C.

TABLE 1

| Sample Ingredients. | | | |
| --- | --- | --- | --- |
|  | Sample 1 | Sample 2 | Sample 3 |
| Modified Potassium Chloride Solution: | 895 g | 908 g | 876 g |
| Sodium chloride | 22.5 g | 22.5 g | 22.5 g |
| Citric acid | 0 | 0 | 14.5 g |
| Water | 127.5 g | 127.5 g | 127.5 g |

A sensory evaluation was performed using a standard frozen soft style pretzel as product to which ½ teaspoon of either a commercially available pretzel salt or by weight blend of 90% of Sample 1, 2, or 3 with 10% pretzel salt was applied. The blend of 90% sample with 10% pretzel salt results in a product with 85% reduced sodium levels compared to the control commercially available pretzel salt alone.

All eight test members expressed that the samples were indistinguishable. Three of the test members expressed that Samples 1-3 blended with pretzel salt had an increased saltiness perception as compared to the control.

Example 6

Enhancement of the Modified Potassium Chloride Product

In order to enhance the particle size of the modified potassium chloride products of Example 1 and Example 3, a sodium chloride solution was repeatedly applied and dried to the modified potassium chloride product.

About 250 pounds of modified potassium chloride was added to the bowl of a 120 kg fluid bed. The bowl was transferred to the fluid bed, and then the fluid bed was started. The air opening was adjusted to ensure good fluidization. A salt/water solution was sprayed through the peristaltic pump set at 600 ml/min. The entire salt solution was sprayed followed by a 30 second spray of water to clear the line/nozzle. The fluid bed was operated using the parameters set forth in Table 2.

TABLE 2

Fluid Bed Parameters.

|  | Target | Range |
|---|---|---|
| Inlet temp. | 75° C. | 60-90° C. |
| Bed temp. | 35° C. | 30-50° C. |
| Air flow | TBD (cfm) | 100-1500 cfm |
| Atom Pressure | 700 PSI | 60-80 PSI |

Periodically, a sample was taken through the sample port and visually inspected for particle size. The amount of water/salt solution was adjusted to achieve the desired particle size. Once the desired particle size was achieved by altering the application of the water/salt solution with drying, the moisture percentage of the particles was measured. If the moisture is above 1.0%, additional drying is needed. Drying was repeated by 5-10 minute increments until moisture was below 1.0%.

After the moisture content was within appropriate limits, a 105 gram sample of the enlarged product was taken for particle size analysis. A RoTap® particle analysis was conducted using the cover, 20, 40, 60, 100, 140 mesh and pan to evaluate the particle size. The results are provided in Tables 3-16. Desired results have 0% below 140 mesh and less than 2% above a 20 mesh. In order to ensure quality and product aesthetics, product may be run through sifting equipment. This removes any large clumps which also may contain high moisture.

TABLE 3

Particle Size of Enhanced Modified Potassium Chloride-Trial 1.

| Pre-Sift | | Post-Sift | |
|---|---|---|---|
| Mesh | Net (g) | Mesh | Net (g) |
| 20 | 16.46 | 20 | 1.11 |
| 40 | 36.81 | 40 | 33.69 |
| 60 | 39.22 | 60 | 47.60 |
| 100 | 10.88 | 100 | 17.41 |
| 140 | 1.27 | 140 | 3.42 |
| Pan | 0.45 | Pan | 1.53 |
| Total | 105.09 | Total | 104.76 |

TABLE 4

Particle Size of Enhanced Modified Potassium Chloride-Trial 2.

| Pre-Sift | | Post-Sift | |
|---|---|---|---|
| Mesh | Net (g) | Mesh | Net (g) |
| 20 | 6.88 | 20 | 1.36 |
| 40 | 13.54 | 40 | 15.17 |
| 60 | 38.35 | 60 | 38.25 |
| 100 | 31.70 | 100 | 32.62 |
| 140 | 11.81 | 140 | 12.55 |
| Pan | 3.63 | Pan | 4.51 |
| Total | 105.91 | Total | 104.46 |

TABLE 5

Particle Size of Enhanced Modified Potassium Chloride-Trial 3.

| Pre-Sift (sampling at 55 min post dry) | | Pre-Sift (sampling at 59 min post dry) | | Pre-Sift (sampling at 69 min post dry) | |
|---|---|---|---|---|---|
| Mesh | Net (g) | Mesh | Net (g) | Mesh | Net (g) |
| 20 | 4.49 | 20 | 3.90 | 20 | 3.83 |
| 40 | 19.16 | 40 | 17.85 | 40 | 19.98 |
| 60 | 43.99 | 60 | 43.54 | 60 | 46.92 |
| 100 | 26.82 | 100 | 28.35 | 100 | 26.20 |
| 140 | 8.13 | 140 | 8.97 | 140 | 6.95 |
| Pan | 2.32 | Pan | 2.45 | Pan | 1.46 |
| Total | 104.91 | Total | 105.06 | Total | 105.34 |

TABLE 6

Particle Size of Enhanced Modified Potassium Chloride-Trial 4.

| Pre-Sift | | Post-Sift | |
|---|---|---|---|
| Mesh | Net (g) | Mesh | Net (g) |
| 20 | 1.49 | 20 | 0.34 |
| 40 | 27.74 | 40 | 22.5 |
| 60 | 52.42 | 60 | 52.90 |
| 100 | 19.45 | 100 | 22.82 |
| 140 | 3.73 | 140 | 5.41 |
| Pan | 0.89 | Pan | 1.83 |
| Total | 105.72 | Total | 105.8 |

TABLE 7

Particle Size of Enhanced Modified Potassium Chloride-Trial 5.

| Pre-Sift | | Post-Sift | |
|---|---|---|---|
| Mesh | Net (g) | Mesh | Net (g) |
| 20 | 3.45 | 20 | 0.17 |
| 40 | 23.23 | 40 | 21.17 |
| 60 | 50.79 | 60 | 53.81 |
| 100 | 21.92 | 100 | 23.88 |
| 140 | 4.68 | 140 | 5.18 |
| Pan | 1.10 | Pan | 1.56 |
| Total | 105.17 | Total | 105.77 |

TABLE 8

Particle Size of Enhanced Modified Potassium Chloride-Trial 6.

| Pre-Sift | | Post-Sift | |
|---|---|---|---|
| Mesh | Net (g) | Mesh | Net (g) |
| 20 | 4.94 | 20 | 0.37 |
| 40 | 17.80 | 40 | 17.05 |
| 60 | 46.01 | 60 | 46.03 |
| 100 | 26.87 | 100 | 28.21 |
| 140 | 7.05 | 140 | 8.44 |
| Pan | 1.86 | Pan | 3.22 |
| Total | 104.53 | Total | 103.32 |

TABLE 9

Particle Size of Enhanced Modified Potassium Chloride-Trial 7.

| Pre-Dry | | Pre-Sift | | Post-Sift | |
|---|---|---|---|---|---|
| Mesh | Net (g) | Mesh | Net (g) | Mesh | Net (g) |
| 20 | 3.62 | 20 | 3.95 | 20 | 0.92 |
| 40 | 37.13 | 40 | 30.99 | 40 | 46.49 |
| 60 | 47.60 | 60 | 49.36 | 60 | 42.22 |
| 100 | 13.90 | 100 | 16.15 | 100 | 11.80 |
| 140 | 1.99 | 140 | 1.92 | 140 | 2.19 |
| Pan | 0.40 | Pan | 0.04 | Pan | 0.65 |
| Total | 104.64 | Total | 102.41 | Total | 104.27 |

TABLE 10

Particle Size of Enhanced Modified Potassium Chloride-Trial 8.

| Pre-Sift | | Post-Sift | |
|---|---|---|---|
| Mesh | Net (g) | Mesh | Net (g) |
| 20 | 2.64 | 20 | 0.47 |
| 40 | 35.30 | 40 | 32.90 |
| 60 | 49.69 | 60 | 51.23 |
| 100 | 15.03 | 100 | 16.63 |
| 140 | 1.26 | 140 | 3.05 |
| Pan | 0.52 | Pan | 0.98 |
| Total | 104.44 | Total | 105.26 |

TABLE 11

Particle Size of Enhanced Modified Potassium Chloride-Trial 9.

| Pre-Sift | | Post-Sift | |
|---|---|---|---|
| Mesh | Net (g) | Mesh | Net (g) |
| 20 | 8.22 | 20 | 1.90 |
| 40 | 30.42 | 40 | 39.90 |
| 60 | 48.15 | 60 | 40.58 |
| 100 | 15.51 | 100 | 21.23 |
| 140 | 2.63 | 140 | 1.00 |
| Pan | 0.65 | Pan | 0.09 |
| Total | 105.58 | Total | 104.69 |

TABLE 12

Particle Size of Enhanced Modified Potassium Chloride-Trial 10.

| Pre-Sift | | Post-Sift | |
|---|---|---|---|
| Mesh | Net (g) | Mesh | Net (g) |
| 20 | 4.78 | 20 | 0.13 |
| 40 | 43.32 | 40 | 34.93 |
| 60 | 44.82 | 60 | 51.47 |
| 100 | 10.95 | 100 | 14.66 |
| 140 | 1.83 | 140 | 3.05 |
| Pan | 0.54 | Pan | 1.36 |
| Total | 106.24 | Total | 105.6 |

TABLE 13

Particle Size of Enhanced Modified Potassium Chloride-Trial 11.

| Pre-Sift | | Post-Sift | |
|---|---|---|---|
| Mesh | Net (g) | Mesh | Net (g) |
| 20 | 3.45 | 20 | 0.14 |
| 40 | 29.32 | 40 | 26.48 |
| 60 | 51.88 | 60 | 53.57 |
| 100 | 17.06 | 100 | 18.52 |
| 140 | 2.53 | 140 | 3.43 |
| Pan | 0.62 | Pan | 1.43 |
| Total | 104.86 | Total | 103.57 |

TABLE 14

Particle Size of Enhanced Modified Potassium Chloride-Trial 12.

| Pre-Sift | | Post-Sift | |
|---|---|---|---|
| Mesh | Net (g) | Mesh | Net (g) |
| 20 | 0.65 | 20 | 0.96 |
| 40 | 24.67 | 40 | 27.67 |
| 60 | 51.02 | 60 | 49.80 |
| 100 | 23.63 | 100 | 21.42 |
| 140 | 4.44 | 140 | 3.82 |
| Pan | 0.80 | Pan | 0.83 |
| Total | 105.21 | Total | 104.5 |

TABLE 15

Particle Size of Enhanced Modified Potassium Chloride-Trial 13.

| Pre-Sift | | Post-Sift | |
|---|---|---|---|
| Mesh | Net (g) | Mesh | Net (g) |
| 20 | 0.93 | 20 | 1.59 |
| 40 | 24.22 | 40 | 21.04 |
| 60 | 52.29 | 60 | 50.00 |
| 100 | 22.17 | 100 | 25.46 |
| 140 | 3.72 | 140 | 5.21 |
| Pan | 0.63 | Pan | 1.28 |
| Total | 103.96 | Total | 104.58 |

TABLE 16

Particle Size of Enhanced Modified Potassium Chloride-Trial 14.

| Pre-Sift | | Post-Sift | |
|---|---|---|---|
| Mesh | Net (g) | Mesh | Net (g) |
| 20 | 0.51 | 20 | 1.56 |
| 40 | 31.44 | 40 | 35.00 |
| 60 | 57.16 | 60 | 52.98 |
| 100 | 14.47 | 100 | 13.54 |
| 140 | 1.14 | 140 | 1.51 |
| Pan | 0.08 | Pan | 0.42 |
| Total | 104.8 | Total | 105.01 |

Example 7

Figure 14A:
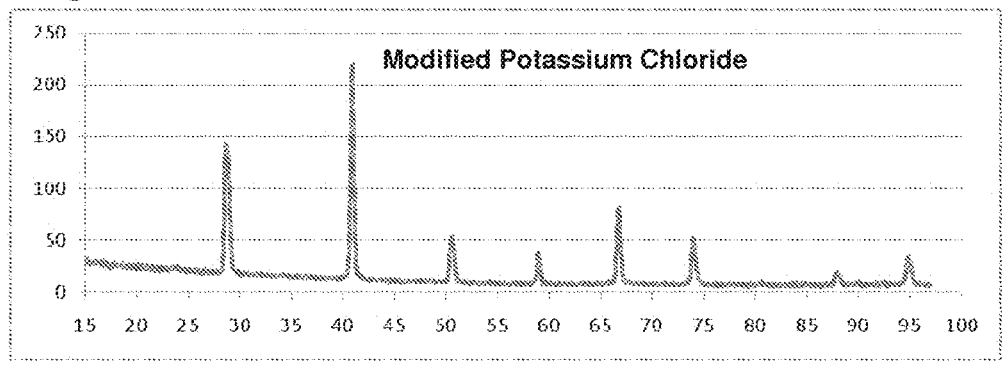
FIG. 14 graphically illustrates the x-ray diffraction analysis for MKCl product before (FIG. 14A) and after (FIG. 14B) the enhancement method.
Figure 14B:
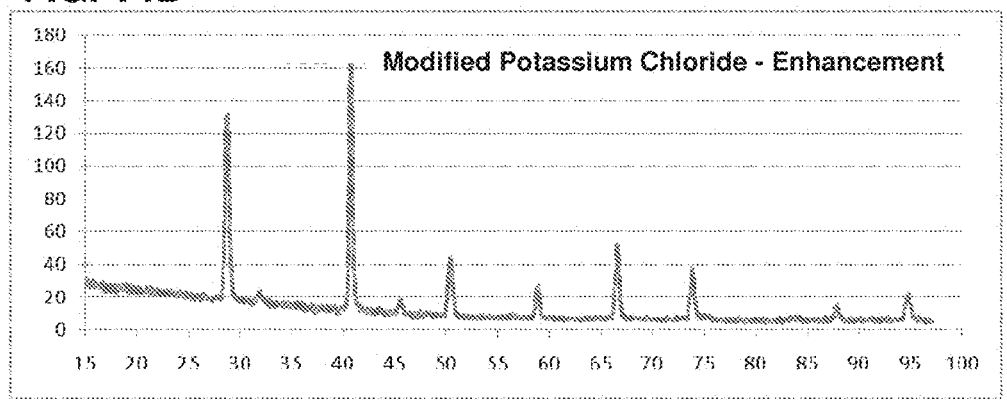
Figure 15A:
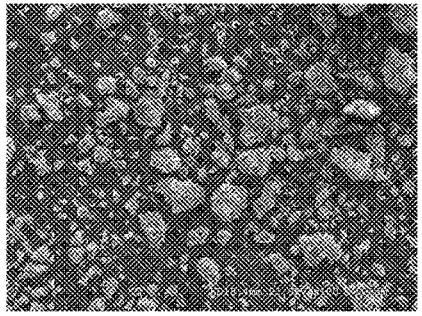
FIG. 15 shows the scanning electron microscopy images for MKCl product before (FIGS. 15A and B) and after (FIGS. 15C and D) the enhancement method at 100× magnification.
Figure 15B:
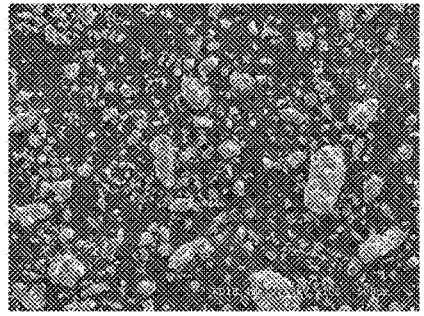
Figure 15C:
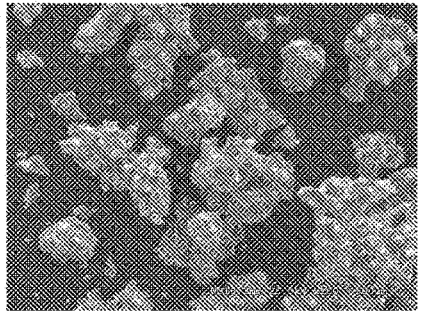
Figure 15D:
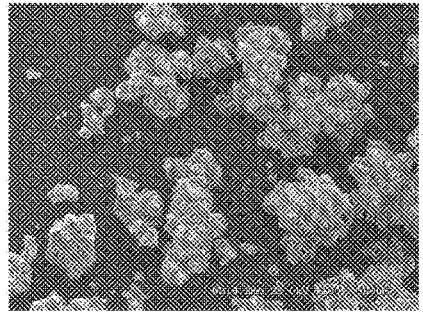
Figure 16A:
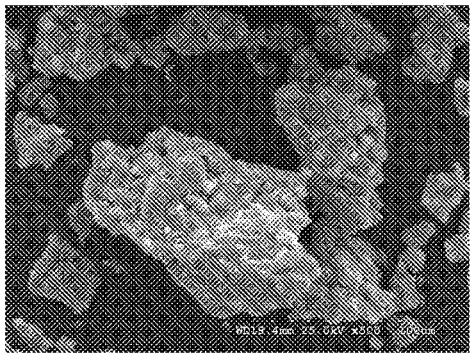
FIG. 16 shows the scanning electron microscopy images for MKCl product before (FIGS. 16A and B) and after (FIGS. 16C and D) the enhancement method at 500× magnification.
Figure 16B:
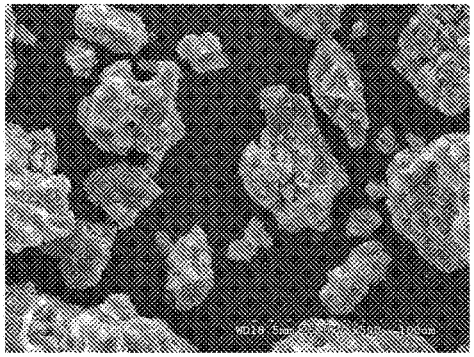
Figure 16C:
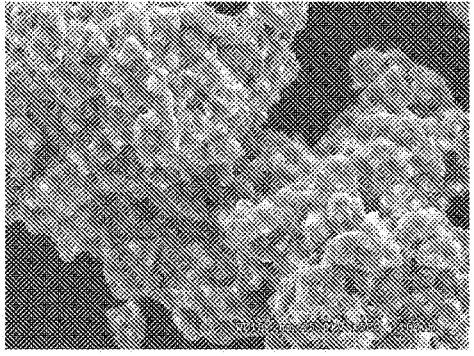
Figure 16D:
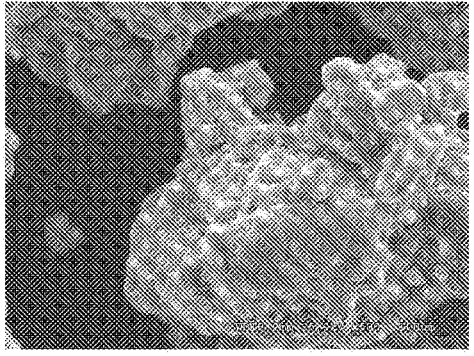
Figure 17A:
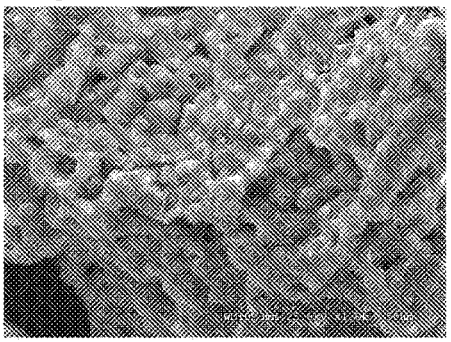
FIG. 17 shows the scanning electron microscopy images for MKCl product before (FIGS. 17A and B) and after (FIGS. 17C and D) the enhancement method at 1000× magnification.
Figure 17B:
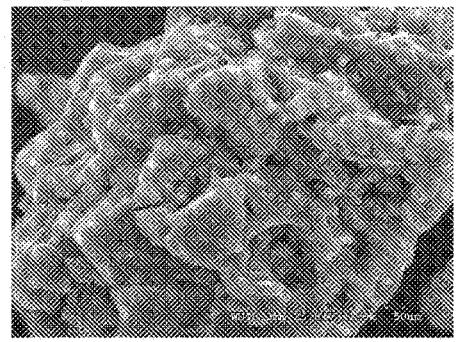
Figure 17C:
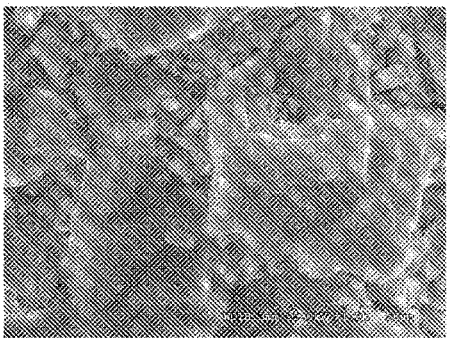
Figure 17D:
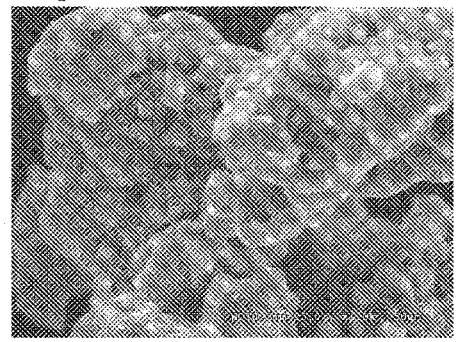

Characterization of Modified Potassium Chloride Following Enhancement Process The modified potassium chloride product enlarged by the process of Example 5 was analyzed using x-ray diffraction, scanning electron microscopy, and content analysis. X-ray diffraction was used to compare the composition of the modified potassium chloride product before and after the enhancement process. The x-ray diffraction patterns are shown in FIG. 14. According to the x-ray diffraction patterns, there were no differences in the base compositions before or after the enhancement process.

Scanning electron microscopy techniques were used to analyze the micro-structure of the modified potassium chloride of Example 5 made with rice flour as a carrier (enhanced MKCl) in comparison with the modified potassium chloride of Example 3 (MKCl). Comparison of MKCl (FIGS. 15A, 15B, 16A, 16B, 17A, and 17B) and enhanced MKCl (FIGS. 15C, 15D, 16C, 16D, 17C, and 17D) at the same magnifications showed that MKCl has smaller particle size than enhanced MKCl.

The content of the enhanced MKCl was analyzed in comparison with the modified potassium chloride of Example 3. Also, modified potassium chloride produced using the methods of Example 5 with sea salt was analyzed. The results of these analyses are summarized in Tables 17-20. The sodium content increases 2% in the enhanced MKCl compared to that of MKCl. Also, the potassium content decreases by 2% in the enhanced MKCl compared to the MKCl.

TABLE 17

Content Analysis, Trial 1.

| Characteristic Analyzed | Received Result (Amount) | Method Reference |
|---|---|---|
| pH | 4.00 Units | SM 18$^{th}$ Ed 4500 H+ |
| Aerobic Plate Count | <10 CFU/gram | BAM 8$^{th}$ Ed |
| Coliform Count | <10 CFU/gram | BAM Ch 4 |
| Escherichia coli | <10 CFU/gram | BAM Ch 4 |
| Mold Count | <10 CFU/gram | BAM 8$^{th}$ Ed |
| Yeast Count | <10 CFU/gram | BAM 8$^{th}$ Ed |
| Salmonella (VIDAS) | Negative | BAM Ch 5/AOAC 2004.03 |
| Weight for Salmonella | 375 grams | |
| Sodium | 2.02% | AOAC 985.01 |
| Potassium | 38.09% | AOAC 985.01 |

TABLE 18

Content Analysis, Trial 2.

| Characteristic Analyzed | Received Result (Home) | Method Reference |
|---|---|---|
| pH | 4.00 Units | SM 18$^{th}$ Ed 4500 H+ |
| Aerobic Plate Count | <10 CFU/gram | BAM 8$^{th}$ Ed |
| Coliform Count | <10 CFU/gram | BAM Ch 4 |
| Escherichia coli | <10 CFU/gram | BAM Ch 4 |
| Mold Count | <10 CFU/gram | BAM 8$^{th}$ Ed |
| Yeast Count | <10 CFU/gram | BAM 8$^{th}$ Ed |
| Salmonella (VIDAS) | Negative | BAM Ch 5/AOAC 2004.03 |
| Weight for Salmonella | 375 grams | |
| Sodium | 1.77% | AOAC 985.01 |
| Potassium | 38.25% | AOAC 985.01 |

TABLE 19

Content Analysis, Trial 3.

| Characteristic Analyzed | Received Result (Amount) | Method Reference |
|---|---|---|
| pH | 4.00 Units | SM 18$^{th}$ Ed 4500 H+ |
| Aerobic Plate Count | <10 CFU/gram | BAM 8$^{th}$ Ed |
| Coliform Count | <10 CFU/gram | BAM Ch 4 |
| Escherichia coli | <10 CFU/gram | BAM Ch 4 |
| Mold Count | <10 CFU/gram | BAM 8$^{th}$ Ed |
| Yeast Count | <10 CFU/gram | BAM 8$^{th}$ Ed |
| Salmonella (VIDAS) | Negative | BAM Ch 5/AOAC 2004.03 |
| Weight for Salmonella | 375 grams | |
| Sodium | 1.93% | AOAC 985.01 |
| Potassium | 38.42% | AOAC 985.01 |

TABLE 20

Content Analysis, Trial 4 (Sea Salt sample).

| Characteristic Analyzed | Received Result (Amount) | Method Reference |
|---|---|---|
| pH | 3.90 Units | SM 18$^{th}$ Ed 4500 H+ |
| Aerobic Plate Count | <10 CFU/gram | BAM 8$^{th}$ Ed |
| Coliform Count | <10 CFU/gram | BAM Ch 4 |
| Escherichia coli | <10 CFU/gram | BAM Ch 4 |
| Mold Count | <10 CFU/gram | BAM 8$^{th}$ Ed |
| Yeast Count | <10 CFU/gram | BAM 8$^{th}$ Ed |
| Salmonella (VIDAS) | Negative | BAM Ch 5/AOAC 2004.03 |
| Weight for Salmonella | 375 grams | |
| Sodium | 19.98% | AOAC 985.01 |
| Potassium | 18.22% | AOAC 985.01 |

Example 8

Enhancement of Modified Potassium Chloride Based Low Sodium Salt Compositions with Additives The modified potassium chloride compositions prepared in Examples 1 and Example 3 were placed in a batch fluid bed system (Glatt GPCG-1). A solution of sodium chloride water and additives were applied to the dry modified potassium chloride composition to initiate particle enhancement (See Table 21 for amounts). The wetted particles were allowed to dry, completing one cycle of particle enhancement. The process of wetting the modified potassium chloride particles with a solution of sodium chloride and water followed by drying was repeated until three full cycles were completed. For this application, product temperatures were kept between 40° C. and 60° C. The solution addition rate during the wetting phase was set at 40 mL per minute. The inlet temperature was set at 95° C.

TABLE 21

Ingredients of Enhancement Solution.

|  | Sample 1 | Sample 2 | Sample 3 |
|---|---|---|---|
| Modified Potassium Chloride Solution: | 876 g | 908 g | 876 g |
| Sodium chloride | 22.5 g | 22.5 g | 22.5 g |
| Monosodium Glutamate | 14.5 | 0 | 14.3 g |
| Disodium 5'-inosinate | 0 | 0 | 0.145 |
| Disodium 5'-guanylate | 0 | 0 | 0.145 |
| Water | 127.5 g | 127.5 g | 127.5 g |

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

What is claimed is:

1. A composition comprising homogeneous particles, the homogeneous particles comprising 2.5 wt % to 80 wt % of a chloride salt, 0.1 wt % to 5 wt % of a food grade acidulant, and 10 wt % to 25 wt % of a carrier.

2. The composition of claim 1, wherein the chloride salt is selected from the group consisting of potassium chloride, magnesium chloride, calcium chloride, and ammonium chloride.

3. The composition of claim 1, wherein the chloride salt is not sodium chloride.

4. The composition of claim 1, wherein the food grade acidulant is selected from the group consisting of citric acid, malic acid, tartaric acid, fumaric acid, lactic acid, acetic acid, and benzoic acid.

5. The composition of claim 1, wherein the carrier is selected from the group consisting of a saccharide and a cereal starch.

6. The composition of claim 5, wherein the carrier is a saccharide, and the saccharide is selected from the group consisting of monosaccharides and disaccharides.

7. The composition of claim 5, wherein the carrier is a cereal starch, and the cereal starch is selected from the group consisting of rice starch, rice cereal, and rice flour.

8. The composition of claim 1, wherein the carrier is selected from the group consisting of dextrin and maltodextrin.

9. The composition of claim 1, further comprising additional particles combined with the homogenous particles to form a mixture, wherein the additional particles comprise sodium chloride and differ in composition from the homogeneous particles.

10. A food product comprising the composition of claim 1.

11. The food product of claim 10, wherein the food product is selected from the group consisting of spice mixtures, soups, sauces, baked goods, meat products, dairy products, breakfast cereals, and table salt.

12. The composition of claim 1, wherein the carrier comprises dextrose.

13. A composition comprising:
a mixture comprising:
a first particulate material, wherein the first particulate material is homogeneous and comprises a chloride salt, a food grade acidulant, and a carrier; and
a second particulate material comprising sodium chloride,
wherein the first particulate material and the second particulate material differ in composition.

14. The composition of claim 13, wherein the first particulate material comprises 15 wt % to 90 wt % of the chloride salt, 0.1 wt % to 5 wt % of the food grade acidulant, and 10 wt % to 25 wt % of the starch.

15. The composition of claim 13, wherein the chloride salt is not sodium chloride.

16. The composition of claim 13, wherein the second particulate material is sodium chloride.

17. The composition of claim 13, wherein the carrier comprises dextrose.

18. A composition formed by a process comprising:
forming an aqueous mixture comprising a chloride salt, a food grade acidulant, and a carrier;
heating the aqueous mixture to dissolve the chloride salt in the aqueous mixture; and
drying the mixture to yield homogeneous particles, wherein the homogenous particles comprise 2.5 wt % to 80 wt % of the chloride salt, 0.1 wt % to 5 wt % of the food grade acidulant, and 10 wt % to 25 wt % of the carrier.

19. The composition of claim 18, wherein the composition further comprises additional particles that differ in composition from the homogeneous particles and comprise sodium chloride.

20. The composition of claim 19, wherein the additional particles are sodium chloride particles.

21. The composition of claim 19, wherein the composition is a homogenous mixture of the homogeneous particles and the additional particles.

22. The composition of claim 18, wherein the carrier comprises dextrose.

* * * * *